(12) United States Patent
Ang et al.

(10) Patent No.: US 11,655,707 B2
(45) Date of Patent: May 23, 2023

(54) SYSTEMS AND METHODS TO UTILIZE SENSORS TO PROVIDE SPATIAL RESOLUTION IN DOWNHOLE LEAK DETECTION

(71) Applicant: Halliburton Energy Services, Inc., Houston, TX (US)

(72) Inventors: Yi Yang Ang, Singapore (SG); Nam Nguyen, Singapore (SG); Joni Polili Lie, Singapore (SG); Yinghui Lu, The Woodlands, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 341 days.

(21) Appl. No.: 16/645,093

(22) PCT Filed: Dec. 29, 2017

(86) PCT No.: PCT/US2017/068930
§ 371 (c)(1),
(2) Date: Mar. 6, 2020

(87) PCT Pub. No.: WO2019/132975
PCT Pub. Date: Jul. 4, 2019

(65) Prior Publication Data
US 2020/0292728 A1 Sep. 17, 2020

(51) Int. Cl.
*G01V 11/00* (2006.01)
*E21B 47/107* (2012.01)
(Continued)

(52) U.S. Cl.
CPC .......... *G01V 11/002* (2013.01); *E21B 47/107* (2020.05); *E21B 47/113* (2020.05); *E21B 47/117* (2020.05); *E21B 47/12* (2013.01)

(58) Field of Classification Search
CPC ..... H04B 7/0408; E21B 47/107; E21B 47/10; E21B 47/005; E21B 47/113; E21B 47/12;
(Continued)

(56) References Cited

U.S. PATENT DOCUMENTS 4,114,721 A * 9/1978 Glenn, Jr. ............ G01V 1/42
181/102
4,930,111 A 5/1990 Sullivan et al.
(Continued)

FOREIGN PATENT DOCUMENTS

CA 2663497 C 4/2014
EP 3227703 A1 * 10/2017 ............. G01S 15/58
(Continued)

OTHER PUBLICATIONS

Ramirez, Juan, Jonathan Odom, and Jeffrey Krolik. "Exploiting array motion for augmentation of co-prime arrays." 2014 IEEE 8th Sensor Array and Multichannel Signal Processing Workshop (SAM). IEEE, 2014 (Year: 2014).*
(Continued)

*Primary Examiner* — Yoshihisa Ishizuka
*Assistant Examiner* — Carter W Ferrell
(74) *Attorney, Agent, or Firm* — Barnes & Thornburg, LLP (57) ABSTRACT

The disclosed embodiments include a method of downhole leak detection. The method of downhole leak detection includes obtaining physical signals detected by at least one physical sensor traveling along a wellbore. Additionally, the method includes detecting correlated sequences from the physical signals and constructing a covariance matrix based on the correlated sequences. The method also includes computing a spatial spectrum indicative of a location of a leak based on the covariance matrix.

20 Claims, 8 Drawing Sheets

(51) Int. Cl.
*E21B 47/117* (2012.01)
*E21B 47/113* (2012.01)
*E21B 47/12* (2012.01)

(58) Field of Classification Search
CPC ........ E21B 49/00; E21B 47/00; E21B 47/117; G01V 11/002; G01V 1/40; G01V 1/50; G01V 1/46; G01V 1/42; G01V 2210/1429; G01V 1/48
See application file for complete search history.

(56) References Cited

U.S. PATENT DOCUMENTS

| | | | |
|---|---|---|---|
| 7,894,300 | B2 | 2/2011 | Hawthorn et al. |
| 8,789,587 | B2 | 7/2014 | Tubel et al. |
| 9,559,417 | B1 * | 1/2017 | Schwarzwalder ... H01Q 3/2605 |
| 2003/0078734 | A1 | 4/2003 | Ozbek |
| 2010/0268489 | A1 * | 10/2010 | Lie .................. E21B 47/107 702/51 |
| 2011/0188346 | A1 * | 8/2011 | Hull .................. E21B 47/107 367/35 |
| 2016/0109605 | A1 | 4/2016 | Bose et al. |
| 2016/0258281 | A1 * | 9/2016 | Mandal .................. G01V 1/40 |
| 2017/0184751 | A1 | 6/2017 | Ang et al. |
| 2017/0269243 | A1 | 9/2017 | Jagannathan et al. |
| 2017/0321540 | A1 | 11/2017 | Lu et al. |
| 2017/0350234 | A1 | 12/2017 | Xia et al. |
| 2018/0010443 | A1 | 1/2018 | Lu et al. |
| 2018/0217021 | A1 | 8/2018 | Lu et al. |

FOREIGN PATENT DOCUMENTS

| | | |
|---|---|---|
| WO | 2014039463 A1 | 3/2014 |
| WO | 2015004487 A3 | 1/2015 |
| WO | 2015013394 A1 | 1/2015 |
| WO | 2015035060 A1 | 3/2015 |
| WO | 2015108668 A1 | 7/2015 |
| WO | 2016010553 | 1/2016 |
| WO | 20160130113 | 8/2016 |
| WO | 2017062015 | 4/2017 |
| WO | 2018071032 | 4/2018 |

OTHER PUBLICATIONS

Jing, Wen-Qian, Daniel Fernandez Comesana, and David Perez Cabo. "Sound source localisation using a single acoustic vector sensor and multichannel microphone phased arrays." INTER-NOISE and NOISE-CON Congress and Conference Proceedings. vol. 249. No. 2. Institute of Noise Control Engineering, 2014 (Year: 2014).*
Cigada, Alfredo, et al. "Moving microphone arrays to reduce spatial aliasing in the beamforming technique: Theoretical background and numerical investigation." The Journal of the Acoustical Society of America 124.6 (2008): 3648-3658.
International Search Report and Written Opinion dated Sep. 21, 2018, International PCT Application No. PCT/US2017/068930.
European Extended Search Report dated May 17, 2021; European Patent Application No. 17936141.5.
Lu, Yinghui, Darren Walters, and Freeman Hill "Flow Rate Estimation of Downhole Leaks Using Acoustic Sensor Array." SPE Annual Technical Conference and Exhibition. Society of Petroleum Engineers, 2016.
Yinghui Lu et al.: "Flow Rate Estimation of Downhole leaks Using;" SPE-181455-MS; SPE Annual Technical Conference and Exhibition held in Dubai, UAE; Sep. 26-28, 2016.

* cited by examiner

SYSTEMS AND METHODS TO UTILIZE SENSORS TO PROVIDE SPATIAL RESOLUTION IN DOWNHOLE LEAK DETECTION

BACKGROUND

The present disclosure relates generally to systems and methods to utilize a sensor to provide spatial resolution in downhole leak detection.

A wellbore is often drilled proximate to a subterranean deposit of hydrocarbon resources to facilitate exploration and production of hydrocarbon resources. Casing sections are often coupled together to extend an overall length of a casing (e.g., a production casing, an intermediate casing, or a surface casing) that is deployed in the wellbore to insulate downhole tools and strings deployed in the casing as well as hydrocarbon resources flowing through casing from the surrounding formation, to prevent cave-ins, and/or to prevent contamination of the surrounding formation. A cement job is usually performed to fixedly secure the casing to the wellbore and to form a barrier that isolates different zones of the wellbore. Over time, the casing and/or the cement sheath may weaken, and one or more leaks may form at different sections of the casing and/or cement sheath. Reservoir fluids that were previously isolated from the casing or isolated from one or more sections of the casing by the cement sheath may leak through the cement sheath and may affect the integrity of the well and jeopardize hydrocarbon production.

Sensors are sometimes deployed downhole to monitor leaks. For example, sensors are sometimes mixed with cement and are fixedly deployed along with the cement. Although stationary sensors may be utilized to detect leaks, sometimes, the stationary sensors are not deployed proximate to the leaks, and thereby do not provide accurate information regarding the locations of the leaks. An array of multiple sensors (sensor array) is sometimes deployed along a production tubing, which extends down the wellbore. One or more sensors of the sensor array may be positioned proximate to the leak and thereby may be operable to detect the leak. Measurements made by different sensors of the sensor array may also be compared to obtain more accurate information regarding the leak. However, the cost associated with fitting a production tubing with multiple sensors, deploying the multiple sensors, and operating the multiple sensors increases proportionally with the number of sensors deployed in the sensor array. Further, in certain wellbore environments, it may be difficult and/or impractical to deploy multiple sensors, thereby impacting leak detection accuracy of the sensor array. Further, one or more sensors of the sensor array may malfunction, which would also adversely impact the accuracy of leak information obtained by the sensor array.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

The illustrated figures are only exemplary and are not intended to assert or imply any limitation with regard to the environment, architecture, design, or process in which different embodiments may be implemented.

DETAILED DESCRIPTION OF ILLUSTRATIVE EMBODIMENTS

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The present disclosure relates to systems and methods to utilize at least one physical sensor to provide spatial resolution in leak detection, as well as downhole leak detectors having at least one physical sensor and operable to provide spatial resolution in leak detection. As defined herein, a physical sensor is an actual sensor that is deployed in a wellbore of a downhole environment and is operable to detect downhole leaks along the wellbore. More particularly, the physical sensor is deployed along a retractable string, such as a wireline tool string, a slickline tool string, a drill string, or another type of tool string operable to deploy the physical sensor. The retractable tool string may be deployed in a wellbore and retracted from the wellbore to facilitate the leak detector to travel between a surface location and a desired depth of the wellbore. In some embodiments, the physical sensor is a hydrophone that is operable to obtain acoustic signals indicative of the leak and originating from a source of the leak. In other embodiments, the physical sensor is an optical fiber that is operable to perform distributed acoustic sensing (DAS) or distributed strain sensing of disturbances caused by the leak. In other embodiments, the physical sensor is an electromagnetic detector operable to obtain electromagnetic signals indicative of the leak and originating from the source of the leak. In further embodiments, the physical sensor is a chemical detector operable to detect chemical imbalances caused by the leak.

As the physical sensor travels up and/or down the wellbore, the leak detector is operable to obtain physical signals indicative of the leak as detected by the physical sensor. As defined herein, "up the wellbore" and "down the wellbore" mean traveling along the wellbore toward a surface end of the wellbore, and traveling along the wellbore away from the surface end of the wellbore, respectively. As the physical sensor travels uphole and/or downhole within the wellbore, the physical sensor continuously records a signal at a high sampling rate. Each of the samples corresponds to a particular time and space instance within the wellbore. With an adaptive one sensor array (OSA) approach to detecting a leak location, windows of correlated sequences are identified in the samples provided by the physical sensor. These correlated sequences are extracted from the recording to form a virtual array of multichannel recordings of the correlated sequences. A covariance matrix may be computed using the virtual array of multichannel recordings, and the covariance matrix is applied to any OSA beamforming algorithm to generate an accurate determination of a location of a leak. Other algorithms may also be used that incorporate multiple physical sensors in place of the OSA beamforming algorithm. In such an embodiment, an array of physical sensors are deployed in a downhole location, and a beamforming algorithm that uses recordings from each of the physical sensors of the physical sensor array is applied to determine a location of the leak.

In some embodiments, the coherent sequence extraction operation obtains a plurality of virtual signals associated with an array of virtual sensors, where each virtual sensor of the array of virtual sensors is located at a virtual distance relative to the physical sensor. As defined herein, a virtual sensor is deployed at a virtual location and a virtual distance from the physical sensor, where the virtual location and the virtual distance have values that are identical to values of a physical location and a physical distance from the physical sensor, respectively. Further, the virtual sensor is a sensor that mimics a physical sensor such that virtual signals associated with the virtual sensor are approximately equal to physical signals that a physical sensor would detect if the physical sensor is located at a physical location that corresponds to the virtual location of the virtual sensor. For example, the leak detector is operable to perform the coherent sequence extraction operation to obtain virtual signals for eight virtual sensors, located at the location of the physical sensor and at least $D_1$-$D_8$ from the location of the physical sensor, where $D_n$ is a numerical value of a physical distance from the physical sensor. The virtual signals of each virtual sensor of eight virtual sensors are approximately equal to physical signals obtained by the physical sensor if the physical sensor is located at the location of the respective virtual sensor.

The leak detector then correlates the obtained virtual signals. For example, the leak detector constructs a covariance matrix of the virtual signals obtained from the coherent sequence extraction operation. The leak detector then applies weights to synchronize the plurality of virtual signals and to account for the correlated sequences. The leak detector then computes a spatial spectrum indicative of a location of a leak based on the synchronized virtual signals and PC sequences and utilizes a beamforming technique, such as traditional beamforming, Capon's beamforming, MUSIC, parametric analysis, azimuthal analysis, and similar techniques to determine a localized peak of the spatial spectrum, where the localized peak is indicative of the location of the leak. Additional descriptions of the foregoing processes, exemplary formulas, and examples are provided in the paragraphs below and are illustrated by at least FIGS. 1-9. Further, although the foregoing operations are described to be performed by the leak detector, the operations may also be performed by a processor of another electronic device, such as a surface based controller that is communicatively connected to the physical sensor and operable to receive the physical signals detected by the physical sensor.

Figure 1A:
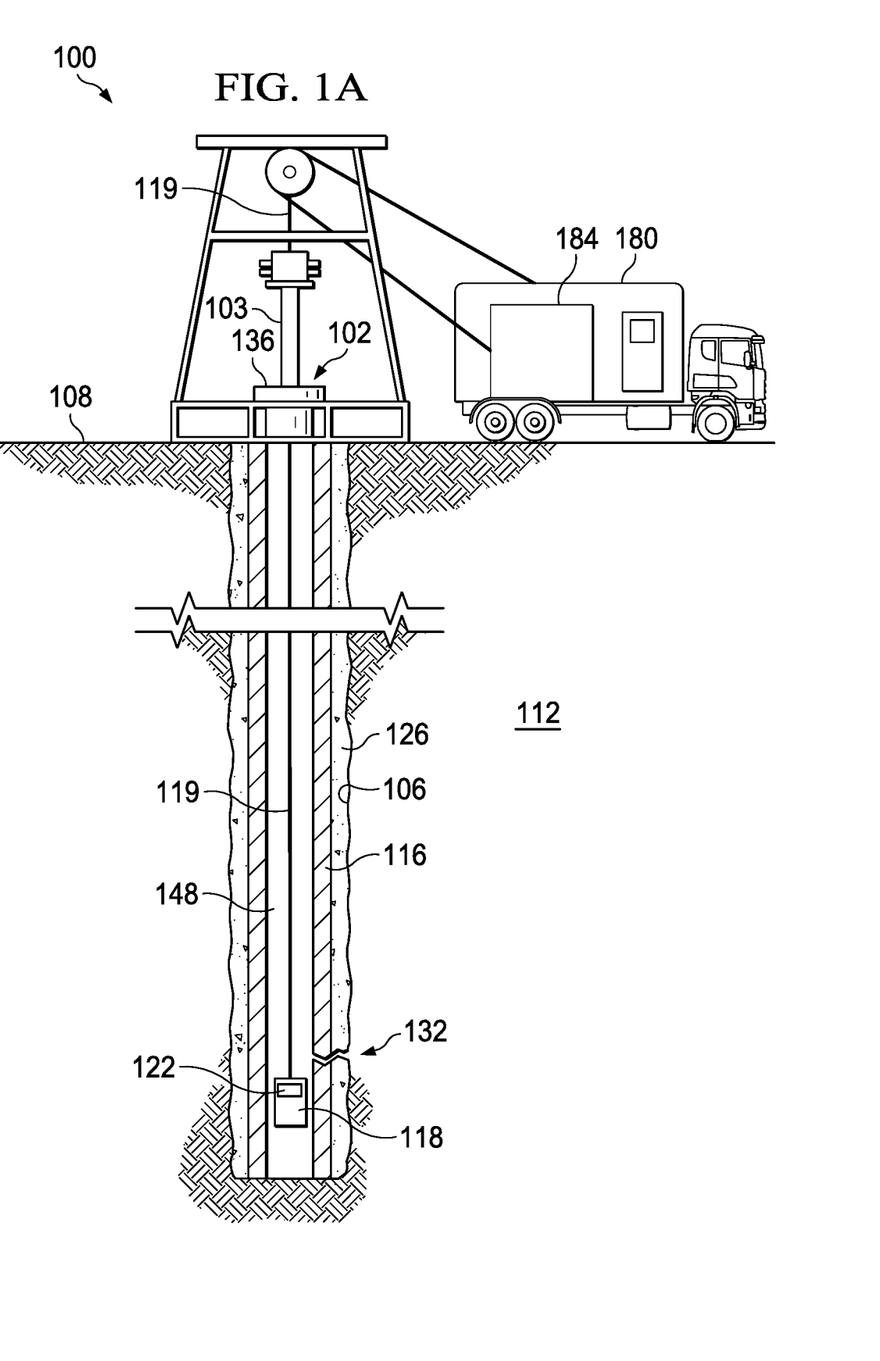
FIG. 1A is a schematic, side view of a wireline logging environment in which a leak detector having a physical sensor operable to detect leaks along a wellbore is deployed on a wireline in the wellbore.

Turning now to the figures, FIG. 1A is a schematic, side view of a wireline logging environment 100 in which a leak detector 118 having a physical sensor 122 operable to detect leaks along wellbore 106 is deployed on wireline 119 in the wellbore 106. In the embodiment of FIG. 1, a well 102 having the wellbore 106 extends from a surface 108 of the well 102 to or through a subterranean formation 112. A casing 116 is deployed along the wellbore 106 to insulate downhole tools and strings deployed in the casing 116, to provide a path for hydrocarbon resources flowing from the subterranean formation 112, to prevent cave-ins, and/or to prevent contamination of the subterranean formation 112. The casing 116 is normally surrounded by a cement sheath 126, which is deposited in an annulus between the casing 116 and the wellbore 106 to fixedly secure the casing 116 to the wellbore 106 and to form a barrier that isolates the casing 116. Although not depicted, there may be layers of casing concentrically placed in the wellbore 106, each having a layer of cement or the like deposited thereabout.

A vehicle 180 carrying the wireline 119 is positioned proximate the well 102. The wireline 119 along with the leak detector 118 and the physical sensor 122 are lowered through the blowout preventer 103 into the well 102. Data indicative of measurements obtained by the physical sensor 122 and/or processed by the leak detector 118 may be transmitted via the wireline 119 or via another telemetry system to the surface 108 for processing by controller 184 or by another electronic device operable to process data obtained by the physical sensor 122 and the leak detector 118. In the embodiment of FIG. 1A, the controller 184 is stored on the vehicle 180. In some embodiments, the controller 184 may also be housed in a temporary and/or permanent facility (not shown) proximate the well 102. In other embodiments, the controller 184 may also be deployed at a remote location relative to the well 102. Additional operations of the controller 184 are provided in the paragraphs below. While only a single physical sensor 122 is depicted in FIGS. 1A and 1B, the illustrated physical sensor 122 may also include multiple physical sensors 122 provided downhole within the well 102.

Figure 1B:
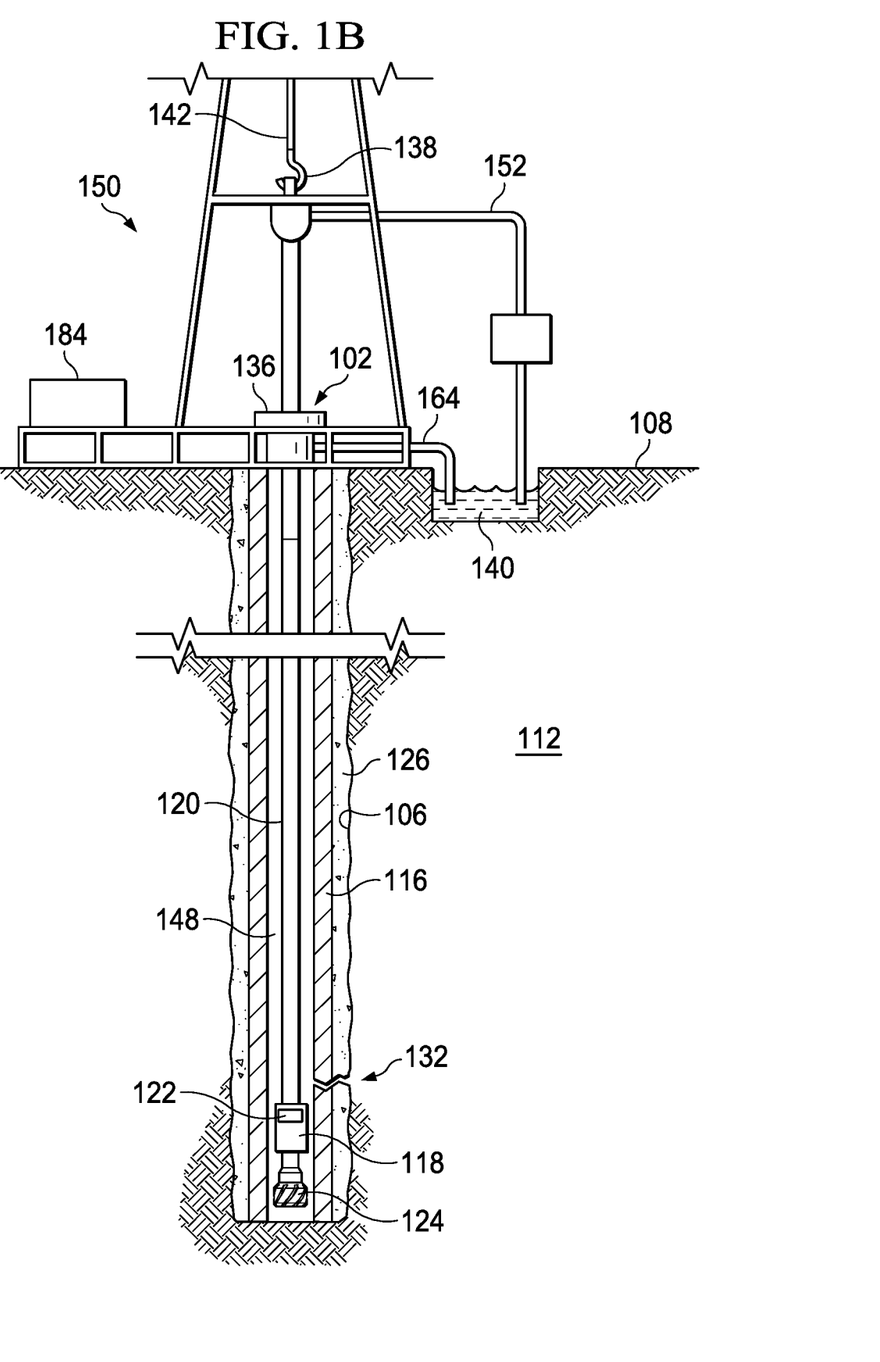
FIG. 1B is a schematic, side view of a logging while drilling (LWD) environment in which the leak detector of FIG. 1A is deployed in the wellbore to detect leaks long the wellbore.

FIG. 1B is a schematic, side view of a logging while drilling (LWD) environment 150 in which the leak detector 118 of FIG. 1A is deployed in the wellbore 106 to detect leaks along the wellbore 106. In the embodiment of FIG. 1B, a hook 138, cable 142, traveling block (not shown), and hoist (not shown) are provided to lower a tool string 120 down the wellbore 106 or to lift the tool string 120 up from the wellbore 106. The tool string 120 may be a drill string, or another type of tool string operable to deploy the leak detector 118. At wellhead 136, an inlet conduit 152 is coupled to a fluid source (not shown) to provide fluids, such as drilling fluids, downhole. The tool string 120 has an internal annulus that provides a fluid flow path from the surface 108 down to the leak detector 118. The tool string 120 is coupled to the leak detector 118, which in the embodiment of FIG. 1B, includes the physical sensor 122. The fluids travel down the tool string 120, and exit the tool string 120 at drill bit 124. The fluids flow back toward the surface 108 through a wellbore annulus 148 and exit the wellbore annulus 148 via an outlet conduit 164 where the fluids are captured in a container 140.

The physical sensor 122 is operable to detect the presence of leaks, such as first leak 132. In the examples of FIGS. 1A and 1B, the first leak 132 represents a leak in the cement sheath 126. As the physical sensor travels uphole and/or downhole within the wellbore 106, the physical sensor 122 continuously records a physical signal at a high sampling rate. Each of the samples corresponds to a particular time and space instance within the wellbore 106. With an adaptive one sensor array (OSA) approach to detecting a leak location, windows of correlated sequences are identified in the samples provided by the physical sensor 122. These correlated sequences are extracted from the recording to form a virtual array of multichannel recordings of the correlated sequences. A covariance matrix may be computed using the array of multichannel recordings, and the covariance matrix is applied to any OSA beamforming algorithm to generate an estimation of a location of the leak 132. Other algorithms may also be used that incorporate multiple physical sensors 122 in place of the OSA beamforming algorithm. In such an embodiment, an array of the physical sensors 122 are deployed in a downhole location, and a beamforming algorithm that uses recordings from each of the physical sensors 122 of the physical sensor array to determine a location of the leak 132.

In the adaptive OSA beamforming algorithm, the leak detector 118 performs a coherent sequence extraction operation on the physical signals detected by the physical sensor 122 to obtain virtual signals associated with an array of virtual sensors and constructs a covariance matrix of the plurality of virtual signals. The leak detector 118 then applies weights to the covariance matrix to synchronize the plurality of virtual signals and to incorporate the virtual array of multichannel recordings of the correlated sequences. In some embodiments, for each virtual sensor of the array of virtual sensors, the leak detector 118 determines a true steering vector of virtual signals corresponding to the respective virtual sensor, and applies the true steering vector to one or more values of the covariance matrix that represents the virtual signals corresponding to the respective virtual sensor. In further embodiments, for each virtual sensor of the array of virtual sensors, the leak detector 118 also determines a temporal correction factor of the virtual signals corresponding to the respective virtual sensor. In such embodiments, the leak detector 118 also determines a modeled transfer function of the virtual signals corresponding to the respective virtual sensor. The leak detector 118 then calculates a virtual weight of the respective virtual sensor relative the physical sensor based on the determined temporal correction factor and the modeled transfer function of the virtual signals corresponding to the respective virtual sensor. The leak detector 118 then applies the true steering vector and the virtual weight to one or more values of the covariance matrix that represent the virtual signals corresponding to the respective virtual sensor.

Subsequently, the leak detector 118 computes a spatial spectrum indicative of a location of the first leak 132 based on the synchronized virtual signals. In some embodiments, the leak detector 118 utilizes a beamforming technique to determine a localized peak of the spatial spectrum, where the localized peak is indicative of the location of the first leak 132. Examples of the beamforming techniques include traditional beamforming, Capon's beamforming, MUSIC, parametric analysis, azimuthal analysis, and similar techniques to determine the localized peak. In some embodiments, the leak detector 118 is further operable to determine an approximate radial distance of the first leak 132 relative to the physical sensor 122. In one of such embodiments, the radial distance includes a first component having a value along a first x-axis, and includes a second component having a value along a second y-axis, where the x-axis and y-axis are perpendicular axes that form a plane that is approximately perpendicular to a longitudinal axis (z-axis) of the wellbore 106. For example, if the physical sensor 122 is positioned at (x, y)=(0 m, 0 m), then the radial distance of the first leak 132 may indicate that the first leak 132 is (2 m, 3 m) relative to the physical sensor 122. In another one of such embodiments, the radial distance includes a first component having a value along a first x-axis, a second component having a value along a second y-axis, and a third component having a value along a z-axis, where the x-axis and y-axis are perpendicular axes that form a plane that is approximately perpendicular to a longitudinal axis (z-axis) of the wellbore 106. For example, if the physical sensor 122 is positioned at (x, y, z)=(0 m, 0 m, 0 m), then the radial distance of the first leak 132 may indicate that the first leak 132 is (2 m, 3 m, 5 m) relative to the physical sensor 122. In further embodiments, the leak detector 118 is operable to determine one or more angles of the first leak 132 relative to the physical sensor 122. In one of such embodiments, an angle of the first leak 132 is indicative of an azimuth of the first leak 132 relative to the physical sensor 122. In another one of such embodiments, an angle of the leak 132 is indicative of the altitude of the leak 132 relative to the physical sensor 122.

Although the leak detector 118 has been described thus far as operable to perform the operations described in the foregoing paragraphs, in one or more embodiments the foregoing operations may also be wholly or partially performed by other surface based or downhole electronic devices communicatively connected to the leak detector 118 and operable to receive the physical signals detected by the physical sensor 122. For example, the controller 184, which is formed by one or more electronic devices, is operable to receive the detected physical signals and to perform the foregoing operations to compute a spatial spectrum indicative of the location of the first leak 132. Additional descriptions of the algorithms used to perform the foregoing operations are provided in the paragraphs below and are illustrated in at least FIGS. 2-9. Further, although FIGS. 1A and 1B illustrate the leak detector 118 and the sensor 122 deployed in two exemplary environments, the leak detector 118 and the sensor 122 may be deployed in various drilling, completion, and production environments. Furthermore, although FIGS. 1A and 1B illustrate the leak detector 118 having one sensor 122, in some embodiments, the leak detector 118 is operable to utilize measurements obtained by multiple sensors (not shown) to perform operations described herein to obtain a plurality of virtual sensors, synchronize virtual signals of the plurality of virtual sensors, and to compute a spatial spectrum indicative of a location of the first leak 132 or another leak in the wellbore 106 based on the synchronized virtual signals.

Figure 2:
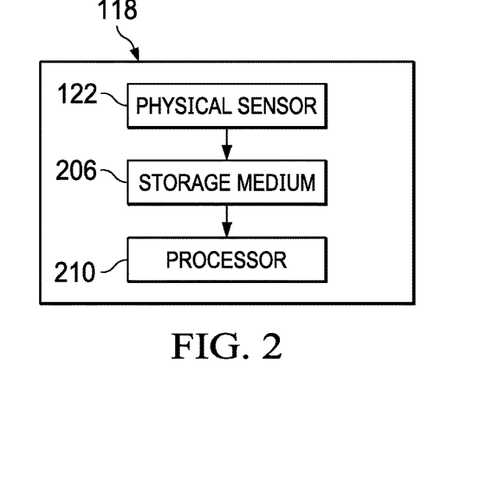
FIG. 2 illustrates a block diagram of components of the downhole leak detector of FIG. 1.

FIG. 2 illustrates a block diagram of components the first downhole leak detector 118 of FIG. 1. The downhole leak detector 118 includes the physical sensor 122. In some embodiments, the physical sensor 122 is a hydrophone that is operable to obtain acoustic signals (physical signals) indicative of the leak and originating from a source of the leak. In other embodiments, the physical sensor 122 is an optical fiber that is operable to perform DAS or distributed strain sensing of disturbances caused by the leak to detect the physical signals. In further embodiments, the physical sensor 122 is an electromagnetic sensor operable to transmit electromagnetic signals that traverse the subterranean formation 112, and to detect variations to transmitted electromagnetic signals as well as secondary electromagnetic signals induced by the first leak 132 and/or by the subterranean formation 112. In further embodiments, the physical sensor 122 is operable to detect nuclear magnet resonance signals of particles of the subterranean formation 112 and/or fluids flowing through the first leak 132. In further embodiments, the physical sensor 122 is operable to detect one or more of a vibration, displacement, velocity, torque, acceleration, conductivity, acoustic impedance, and other properties of the wellbore 106 at a location proximate to first leak 132.

The leak detector 118 also includes a storage medium 206. The storage medium 206 is a machine-readable medium and may be formed from data storage components such as, but not limited to, read-only memory (ROM), random access memory (RAM), flash memory, magnetic hard drives, solid state hard drives, as well as other types of data storage components and devices. In some embodiments, the storage medium 206 includes multiple data storage devices. Physical signals detected by the physical sensor 122, as well as virtual signals associated with virtual sensors are stored on the storage medium 206. The storage medium 206 also includes instructions for operating the leak detector 118 as well as instructions for establishing communications with other downhole and surface based electronic devices such as the controller 184.

Additionally, the leak detector 118 includes a processor 210 that is operable to execute the instructions stored in the storage medium 206 to obtain the physical signals detected by the physical sensor 122 as the physical sensor 122 travels along the wellbore 106. The processor 210 is operable to identify windows or frames of correlated sequences observed in the sampling provided by the physical sensor 122, to form a virtual array of multichannel recordings of the correlated sequences, and to compute a covariance matrix using the multichannel recordings. The processor 210 is also operable to perform a coherent sequence extraction operation on the physical signals of the physical sensor 122 to obtain a plurality of virtual signals associated with an array of virtual sensors. The processor 210 is further operable to construct the covariance matrix incorporating the plurality of the virtual signals obtained from the extracted correlated sequence. The processor 210 is further operable to adjust values of the covariance matrix to synchronize the plurality of the virtual signals. The processor 210 is further operable to compute a spatial spectrum indicative of a location of the leak based on the synchronized virtual signals and to utilize a beamforming technique disclosed herein to determine a localized peak of the spatial spectrum, where the localized peak is indicative of the location of the leak. In one of such embodiments, the processor 210 is housed within a casing of the leak detector 118.

Although FIG. 2 illustrates the processor 210 as a component of the leak detector 118, in other embodiments, a processor of a surface based electronic device (surface based processor), such as the controller 184 is also operable to perform the operations of the processor 210. In one of such embodiments, physical signals obtained by the sensor 122 are transmitted to the controller 184 via one or more downhole telemetry systems. The surface based processor is operable to perform the operations described herein to compute a spatial spectrum indicative of a location of the leak based on the synchronized signals, utilize beamforming to determine a localized peak of the spatial spectrum, as well as other operations described herein. In further embodiments, the processor 210 is a sub-component of the physical sensor 122. In further embodiments, the processor 210 is a separate component that is deployed at a downhole location and is operable to perform the operations described herein to compute the spectral spectrum indicative of the location of the first leak 132. In each of the foregoing embodiments, the processor 210 and the leak detector 118 form a leak detection system that performs the operations described herein to compute a spatial spectrum indicative of a location of a leak based on the synchronized virtual signals.

Figure 3:
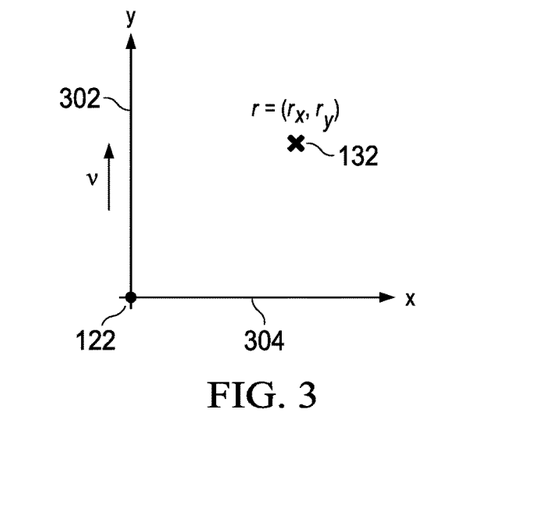
FIG. 3 illustrates a schematic view of the physical sensor of FIG. 1 at time t=0 as the physical sensor travels along a longitudinal axis (y-axis) of the wellbore at a velocity equal to v.

FIG. 3 illustrates a schematic view of the physical sensor 122 of FIG. 1 at time t=0 as the physical sensor 122 travels along a longitudinal axis (y-axis) 302 of the wellbore at a velocity equal to v. The velocity v is an approximately constant velocity while the physical sensor 122 samples physical signals. At time t=0, the location of the physical sensor 122 along an x-axis 304 and the y-axis 302 is (0,0). As the physical sensor 122 travels along the y-axis 302, samples of physical signals detected by the physical sensor 122 are obtained and stored by the leak detector 118. The leak 132 may generate a portion of the physical signals detected by the physical sensor 122. This portion of the physical signals is used to identify a location of the leak 132 within the wellbore 106.

Figure 4:
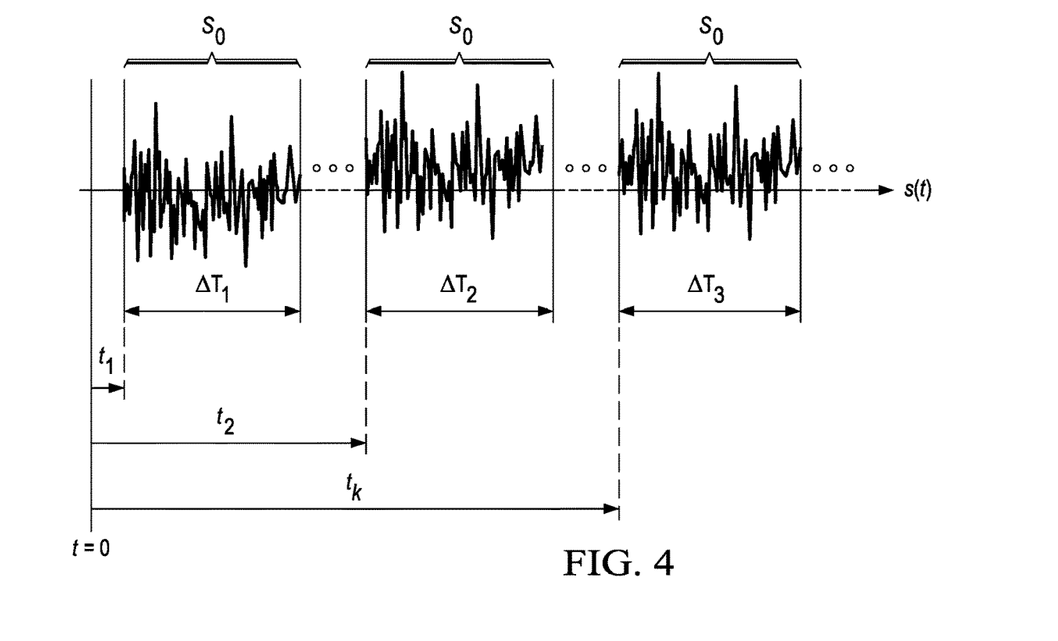
FIG. 4 illustrates a visual representation of a physical signal s(t) that is recorded by the physical sensor.

As the physical sensor 122 moves within the wellbore 106, the physical sensor 122 continuously records the physical signals at a high sampling rate. Each sample of the recording corresponds to a sample of the physical signals at a particular time and space instance. FIG. 4 illustrates a depiction of a physical signal s(t) that is recorded by the physical sensor 122. The physical signal s(t) includes frames $\Delta T_1$, $\Delta T_2$, and $\Delta T_3$ of time in which correlated sequences $S_0$ occur. These sequences $S_0$ are determined and extracted from the physical signal s(t) to form a virtual array of multichannel recordings. From the virtual array of multichannel recordings, a covariance matrix is computed, and a one sensor array (OSA) beamforming algorithm is applied to localize the physical signal of the leak 132 and to generate a spatial power spectrum of an area near the moving physical sensor 122.

The signal s(t) may be modeled by the following equation:

$$s(t) = \Sigma_k s_1(t-t_k), \quad 0 < t < T, \qquad \text{EQ. 1}$$

where $t_k$ is a constant that captures a time delay from t=0 to a kth occurrence of the sequences $S_0$. In this manner, a function that describes the occurrence of each repetition of the sequences $S_0$ of FIG. 4 is described by the following equation:

$$s_1(t) = \begin{cases} s_0(t) & 0 < t < T_0 \\ 0 & \text{otherwise} \end{cases}, \qquad \text{EQ. 2}$$

The repetitive source provided by the leak 132 is located at r=($r_x$,$r_y$), as depicted in FIG. 3, in a Cartesian coordinate system, and the repetitive source propagates toward the moving physical sensor 122, which is initially located at the origin of FIG. 3. The moving physical sensor 122 moves with the velocity v. In such an embodiment, a signal p(t) received at the physical sensor 122 is modeled by the following equation:

$$p(t) = \frac{1}{r_t} s\left(t - \frac{r_t}{c}\right) \qquad \text{EQ. 3}$$

where $r_t = \|vt - r\|_2$ and represents a Euclidean distance between the location of the source (i.e., the leak 132) at r and the moving physical sensor 122 with the velocity v at time t. Additionally, $r_t/c$ is a propagation delay of the physical signal toward the physical sensor 122.

Expanding EQ. 3 with EQ. 1 results in the following equation representing the signal p(t):

$$p(t) = \begin{cases} \frac{1}{r_t} \sum_k s_0\left(t - \frac{r_t}{c} - t_k\right) & 0 < t < T_0 \\ 0 & \text{otherwise} \end{cases} \qquad \text{EQ. 4}$$

In a complex exponential form, p(t) is represented by the following equation:

$$p(t) = \begin{cases} \sum_k A_k(t) e^{j\omega(t-t_k)} e^{-j\omega \frac{r_t}{c}} & 0 < t - t_k < T_0 \\ 0 & \text{otherwise} \end{cases} \qquad \text{EQ. 5}$$

where $A_k(t) = \sigma_k/r_t$ is an amplitude of the complex exponential at time t, with $\sigma_k$ being a magnitude of the kth complex exponential. When the complex exponential representation of p(t) is considered for $$0 < t - t_k - \frac{r_t}{c} < T_0,$$

and when splitting the complex exponential representation of p(t) into k frames, each sequence $S_0$ represented as $p_k(t)$ is represented in the following equation:

$$p_k(t) = A_k(t) e^{j\omega(t - \frac{r_t}{c} - t_k)}, \; 0 < t - t_k - r_t/c < T_0, \qquad \text{EQ. 6}$$

which is rearranged into the following equation:

$$p_k(t) = \frac{\sigma_k}{r_k(t)} e^{j\omega t} e^{+j\omega \Delta T_k} e^{-j\omega \frac{r_k(t)}{c}}, \; 0 < t < T_0, \qquad \text{EQ. 7}$$

where $\Delta T_k$ is a delay that p(t) has to wait before the kth $s_0(t)$ sequence in s(t) appears at the physical sensor 122 and $r_k(t) = \|(t + \Delta T_k) \cdot v - r\|_2$ is a distance of the source (i.e., the leak 132) from the moving physical sensor 122 from time $\Delta T_k$ onwards.

Concatenating each of the k frames of the signal s(t) provides the following multi-channel representation of the virtual sensors of the K frames:

$$p(t) = [p_1(t) p_2(t) \ldots p_K(t)]^T, \; 0 < t < T_0, \qquad \text{EQ. 8}$$

which may be rearranged into the following representation of a virtual array of multichannel recordings:

$$p(t) = e^{j\omega t} \begin{bmatrix} e^{+j\omega \Delta T_1} & 0 & \cdots & 0 \\ 0 & e^{+j\omega \Delta T_2} & \cdots & 0 \\ \vdots & \vdots & \ddots & \vdots \\ 0 & 0 & \cdots & e^{+j\omega \Delta T_K} \end{bmatrix} \begin{bmatrix} \frac{\sigma_1}{r_1(t)} e^{-j\omega \frac{r_1(t)}{c}} \\ \frac{\sigma_2}{r_2(t)} e^{-j\omega \frac{r_2(t)}{c}} \\ \vdots \\ \frac{\sigma_K}{r_K(t)} e^{-j\omega \frac{r_K(t)}{c}} \end{bmatrix} \qquad \text{EQ. 9}$$

$$0 < t < T_0,$$

Through EQ. 9, a temporal delay component, $e^{+j\omega \Delta T_k}$, of p(t) is evident. Further, a source component, $e^{j\omega t}$, and a propagation and attenuation component, $$\frac{\sigma_k}{r_k(t)} e^{j\omega t} e^{-j\omega r_k/c},$$

are observable. If $r_{t_k}$ from $0 < t < T_0$ is approximately constant, the equation representing p(t) is similar to a static sensor response. Additionally, the observed temporal-delay component in EQ. 9 is correctable with a temporal correction factor: $A_c = \text{diag}([e^{-j\omega \Delta T_1} \; e^{-j\omega \Delta T_2} \ldots e^{-j\omega \Delta T_K}])$.

Figure 5:
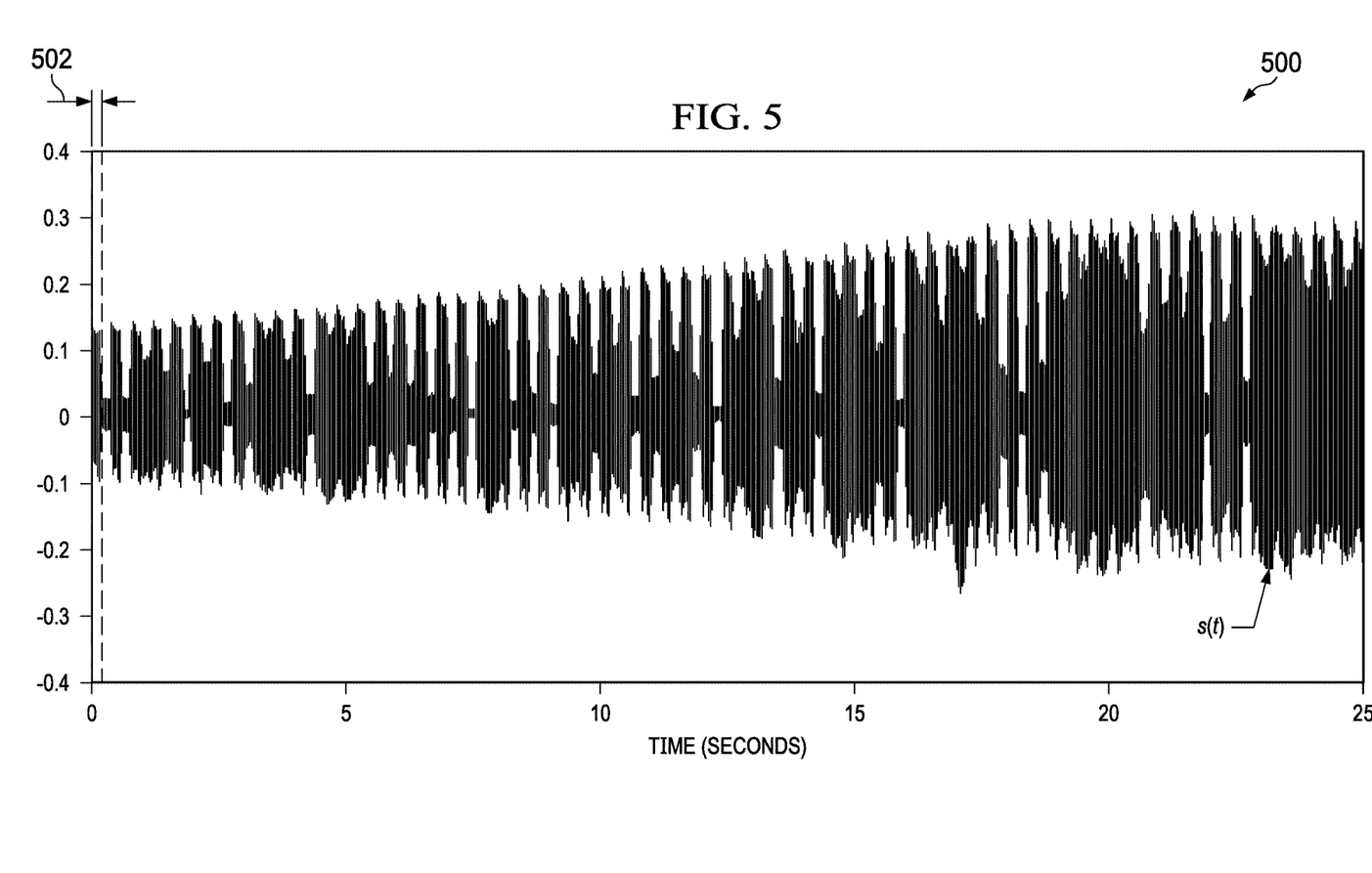
FIG. 5 illustrates a visual representation of a physical signal s(t) from time t=0 to time t=25 seconds.

There are various ways to determine the correlated sequences $s_0$ of the physical signal s(t). One such approach is to use peaks of an autocorrelation of EQ. 3 through machine learning and/or signal feature extraction. An additional embodiment relies on finding a cross correlation of EQ. 5. Using the cross correlation of EQ. 5, $\hat{s}_0$ can be visualized as a window frame within EQ. 8. Accordingly, FIG. 5 provides a visual representation 500 of the physical signal s(t) from time t=0 to time t=25 seconds. Within the physical signal s(t), $\hat{s}_0$ 502 represents the frame of time of the physical signal s(t) from time t=0 to time t=0.2 seconds.

Figure 6:
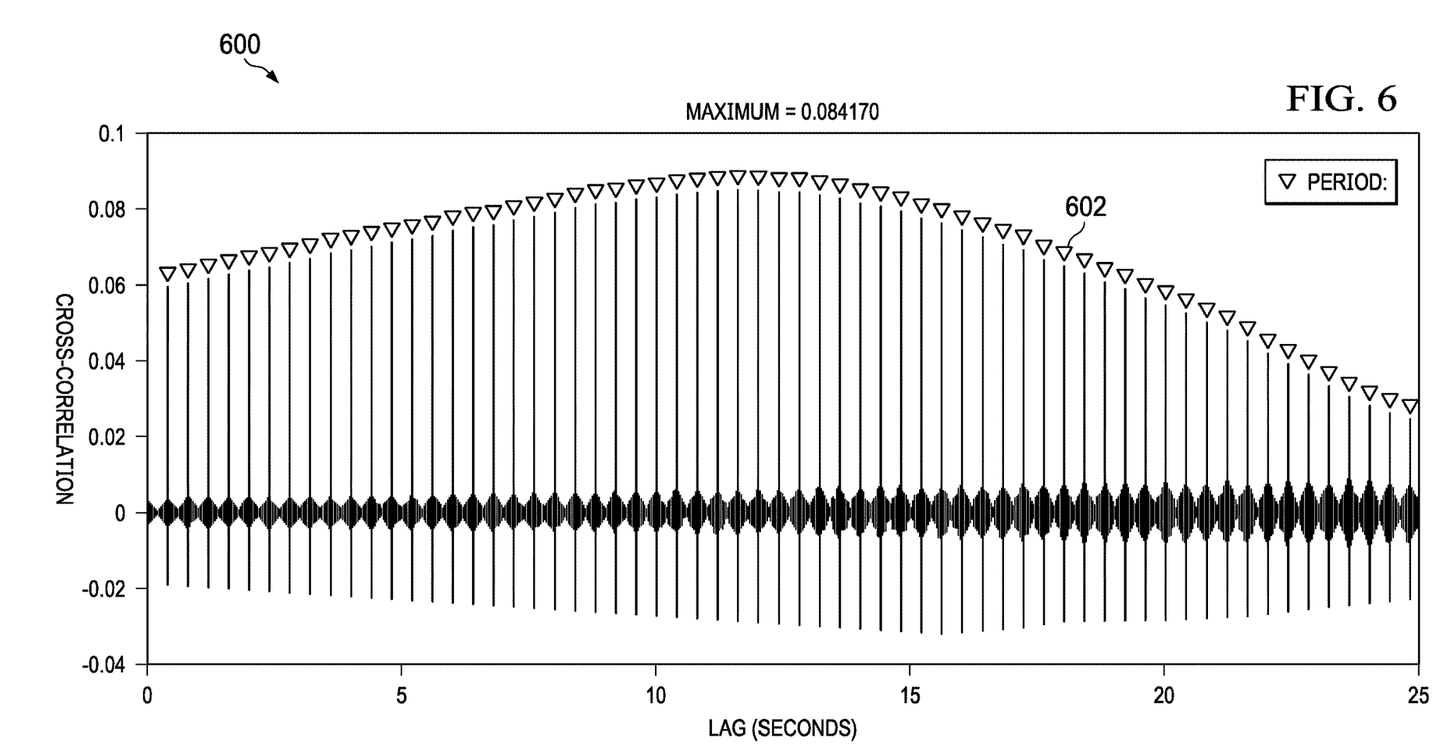
FIG. 6 illustrates a visual representation of cross correlation of the signal s(t) with a signal frame $\hat{s}_0$.

FIG. 6 depicts a visual representation of cross correlation 600 of the signal s(t) with a signal frame $\hat{s}_0$, which are defined above with respect to FIG. 5. Each period 602 of the physical signal s(t) of the cross correlation 600 provides an indication of how closely that period 602 matches the window frame $\hat{s}_0$ on a scale from 0 to 0.1, with 0.1 being a perfect match. The cross correlation 600 measures the similarity of sections of the signal s(t) with the window frame $\hat{s}_0$ (e.g., $\hat{s}_0$ 502 of FIG. 5) of the signal s(t). The cross-correlation of EQ. 8 is calculated with the following equation:

$$r_{\hat{s}_0 p}(l) = \sum_{n=0}^{N-1} \hat{s}_0(n) p(n-l), \; l = 0, \pm 1, \pm 2, \ldots \qquad \text{EQ. 10}$$

The elapsed time of the occurrence of the repetitive frames $\Delta T_1, \Delta T_2, \ldots, \Delta T_k$ are extracted by determining a set of k maximums from the following equation:

$$\Delta T_k = \max_{l_k} r_{\hat{s}_0 p}(l_k), \qquad \text{EQ. 11}$$

After determining the multichannel representation p(t) from EQs. 8 or 9 of the physical signal received by the moving physical sensor 122, along with a matrix of the repetitive frames $\Delta T_1, \Delta T_2, \ldots, \Delta T_k$ determined from EQ. 11 and the velocity of the physical sensor 122, these values are applied to a one sensor array (OSA) beamforming algorithm. The result of the OSA beamforming algorithm is the computation of a spatial power spectrum of an area surrounding the moving physical sensor 122 to provide an indication of a location of the leak 132, as described in detail below with respect to FIG. 7.

Figure 7:
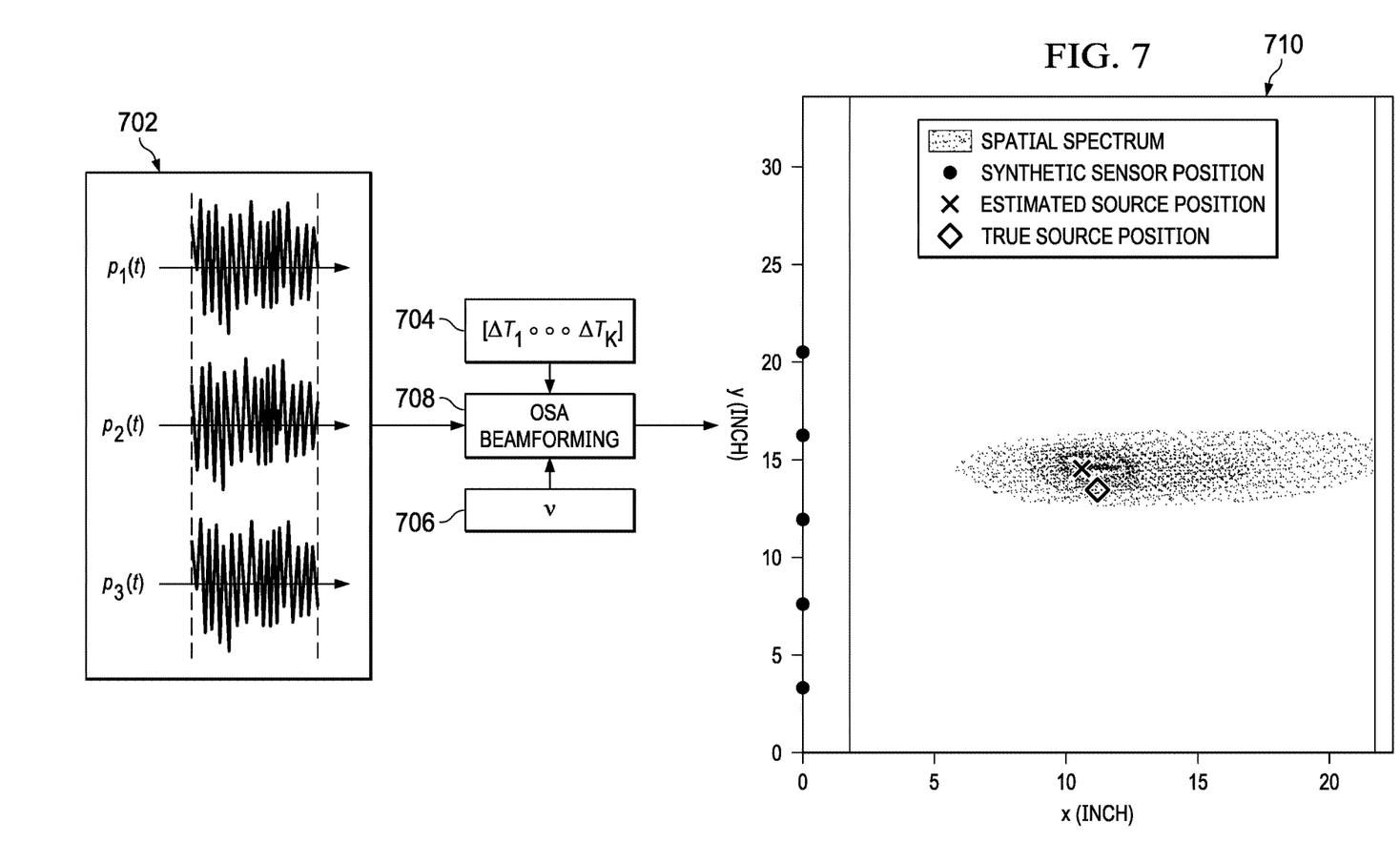
FIG. 7 illustrates a block diagram of a process using the multichannel representation of p(t) to compute a spatial spectrum indicative of a location of a leak.

Turning to FIG. 7, a simplified block diagram of a process 700 using the multichannel representation of p(t) to compute a spatial spectrum indicative of a location of a leak, such as the first leak 132 of FIG. 1, is illustrated. At block 702, the multichannel representation of p(t) is determined. Similarly, at block 704, the matrix of the repetitive frames $\Delta T_1$, $\Delta T_2, \ldots, \Delta T_k$ is determined, and, at block 706, the velocity of the physical sensor 122 is recorded.

At the OSA beamforming algorithm block 708, a covariance matrix is constructed from the multichannel representation of p(t) obtained from EQ. 9. The following equation builds on EQ. 9 to construct the N×N covariance matrix:

$$\hat{R}_{pp} = E\left[p(t)p^H(t)\right] = \frac{1}{T_0}\int_0^{T_0} p(t)p^*(t)dt \quad \text{EQ. 12}$$

Generally, at block 708, any known beamforming algorithm may be applied using EQs. 8 and/or 9 where the beamforming algorithm achieves localization by constructing, at block 710, a one sensor array (OSA) spatial power spectrum and searching for peaks of the spatial power spectrum that indicate the location of the leak 132. With $\mathcal{R} = \{\hat{r}_0 \ldots \hat{r}_L\}$ denoting vectors pointing to discrete points within the OSA search area in a free field and $\hat{v}=(\hat{v}_x,\hat{v}_y)$ being the estimated velocity of the moving physical sensor 122 that is provided at block 706, the position of the nth synthetic sensors (i.e., virtual sensors) of the OSA is determined using the displacement of the physical sensor 122 from an origin at $v\Delta T_k(k-0.5)$.

For each location of the synthetic sensors, a steering vector $\hat{a}(\hat{r}_j)$, which is a modeled transfer function from $\hat{r}_j$ to the virtual sensors, is computed and applied to the beamforming algorithm to compute the spatial spectrum at block 710. As an example, a minimum variance distortionless response (MVDR) or Capon spatial spectrum may be computed with the following equation:

$$\hat{r}_l = \underset{\hat{r}_j \in \mathcal{R}}{\arg\max} \frac{1}{\hat{a}^H(\hat{r}_j)A_c^{-H}\hat{R}_{PP}^{-1}A_c^{-1}\hat{a}(\hat{r}_j)} \hat{r}_l = \underset{\hat{r}_j \in \mathcal{R}}{\arg\max} \frac{1}{w^H(\hat{r}_j)\hat{R}_{PP}^{-1}w(\hat{r}_j)}, \quad \text{EQ. 13}$$

where $(.)^*$ & $(.)^H$ indicate a complex conjugate transpose operation and a Hermitian operation, respectively. Additionally, $w(\hat{r}_j)=A_c^{-1}\hat{a}(\hat{r}_j)=A_c^{-H}\hat{a}(\hat{r}_j)$ is a weighting factor of the virtual sensors of the adaptive OSA beamforming technique. A beamforming technique disclosed herein may utilize EQ. 13 to determine a localized peak of the spatial spectrum illustrated at block 710, where the localized peak is indicative of the location of the leak.

Figure 8:
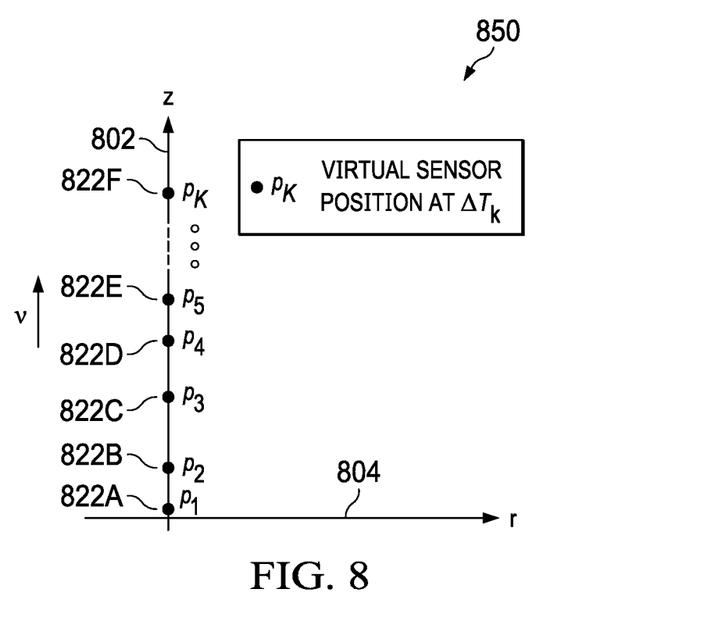
FIG. 8 illustrates an array of virtual sensors formed based on the physical sensor of FIG. 3 as the physical sensor travels along the longitudinal axis of the wellbore at velocity v.
Figure 9:
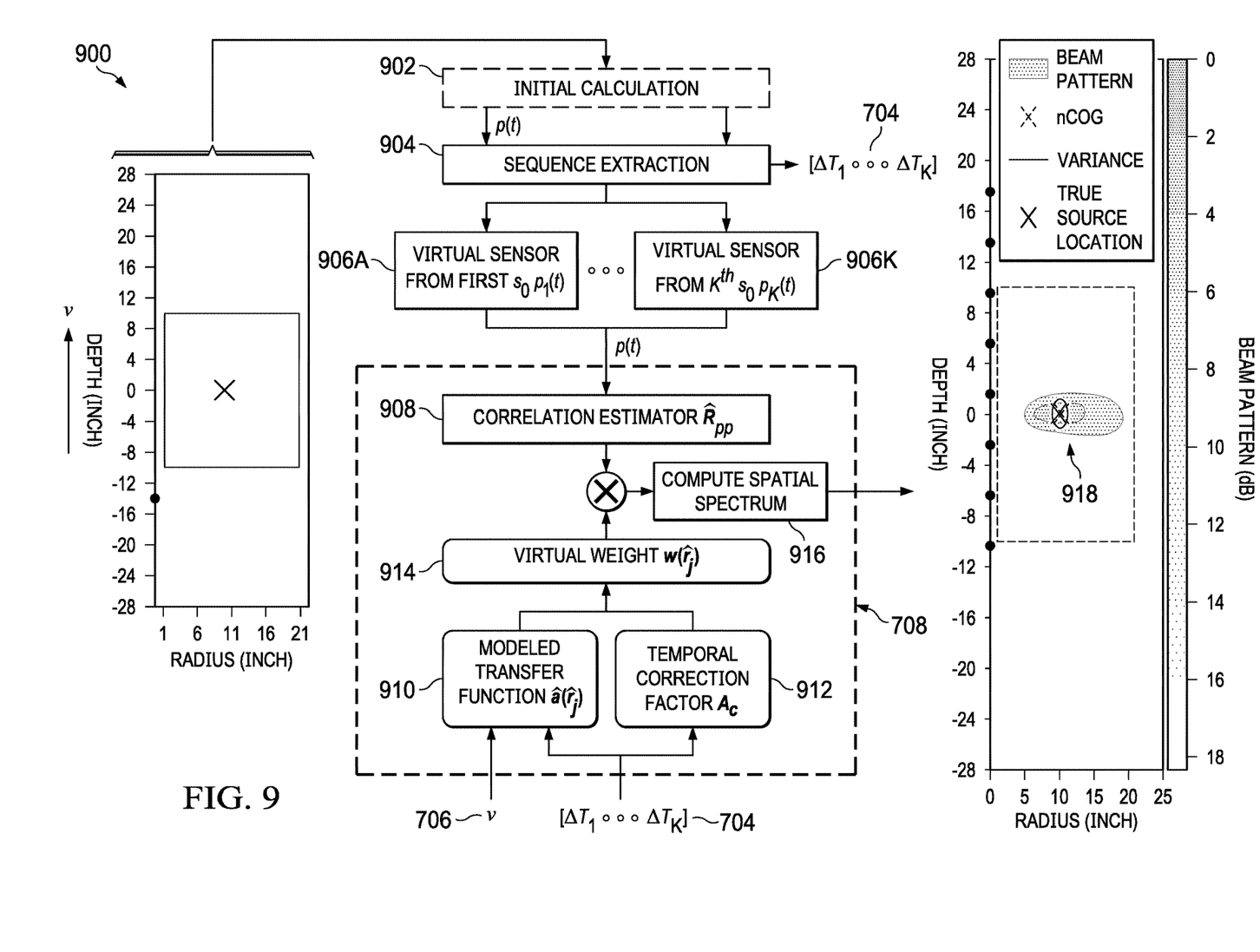
FIG. 9 illustrates a block diagram of a process for utilizing a virtual array formed from one physical sensor (one sensor array), such as the physical sensor of FIG. 1, to compute a spatial spectrum indicative of a location of a leak.

To illustrate the OSA beamforming algorithms, FIGS. 8 and 9 provide additional illustrations of the processes associated with OSA beamforming. For example, FIG. 8 illustrates a coordinate view 850 of an array of virtual sensors 822A-822F formed based on the physical sensor 122, as the physical sensor 122 travels along a z-axis 802, which is a longitudinal axis of the wellbore 106, at velocity v. As the physical sensor 122 travels along the z-axis 802, in addition to detecting the correlated sequences of the physical signals discussed above, samples of the physical signals detected by the physical sensor 122 are obtained as extracted correlated sequences. Each of the extracted correlated sequences are utilized to form a virtual sensor 822 of the array of virtual sensors 822A-822F. Once the array of virtual sensors 822A-822F is formed, EQs. 8 and 9, discussed in detail above, are used as the multi-channel representations of the array of virtual sensors 822A-822F.

FIG. 9 illustrates a block diagram of a process 900 for utilizing a virtual array formed from one physical sensor (one sensor array) such as the physical sensor 122 of FIG. 1 to compute a spatial spectrum indicative of a location of a leak, such as the first leak 132 of FIG. 1. At block 902, initial calculations are performed to determine the initial position of the physical sensor 122. In the example of FIG. 4, the physical sensor 122 ($m_1$) is initially located at an origin across two perpendicular axes x and y. This location is expressed as (x, y)=(0, 0). The physical sensor 122 is operable to detect a near field leaking source signal, $S_0(t)$, where the leaking source signal is located at a spatial position of $r_0=(x_0, y_0)$. The received signal of the physical sensor 122 may be represented by EQ. 7 provided above.

At block 904, a sequence extraction operation of the received signal of the physical sensor 122 is performed. The sequence extraction operation results in the matrix of the correlated sequences $S_0$ found in the repetitive frames $\Delta T_1$, $\Delta T_2, \ldots, \Delta T_k$, as determined in block 704 of FIG. 7. The repetitive frames $\Delta T_1, \Delta T_2, \ldots, \Delta T_k$ are representative of portions of time of the physical signal s(t) during which the correlated sequences $S_0$ occur. At block 906A-906K, an array of K total virtual sensors is formed based on the sequence extraction operation described herein. Concatenating each of the K frames of the signal s(t) provides the multi-channel representation of the virtual sensors 906A-906K using EQs. 8 and 9, which are described above in the discussion of FIG. 4.

At a correlation estimator $\hat{R}_{pp}$ block 908, the multi-channel representation of the virtual sensors 906A-906K are used to generate the covariance matrix $\hat{R}_{pp}$ of EQ. 12. Further, at block 910, a modeled transfer function $\hat{a}(\hat{r}_j)$ from $\hat{r}_j$ to the virtual signals is computed using the estimated velocity v of the physical moving sensor, as described above in block 706 of FIG. 7. At block 912, a temporal correction factor of the virtual signals, $A_c=\text{diag}([e^{-j\omega\Delta T_1} \ e^{-j\omega\Delta T_2} \ldots e^{-j\omega\Delta T_K}])$, is determined. Each of blocks 910 and 912 also rely on an indication of the repetitive frames $\Delta T_1$, $\Delta T_2, \ldots, \Delta T_k$ of the signal s(t), as determined at block 704 in FIG. 7. The modeled transfer function and the temporal correction factor of blocks 910 and 912 are then used at block 914 to calculate a virtual weight, $w(\hat{r}_j)=A_c^{-1}\hat{a}(\hat{r}_j)=A_c^H\hat{a}(\hat{r}_j)$, of each of the virtual sensors 906A-906K. The virtual weight is applied to the covariance matrix determined at block 908 to adjust the weighting of the virtual sensors 906A-906K.

Upon applying the virtual weight, a spatial spectrum 918 indicative of the location of the leak is computed at block 916 based on the adjusted covariance matrix. A beamforming technique disclosed herein may utilize EQ. 12 to determine a localized peak of the spatial spectrum 418, where the localized peak is indicative of the location of the leak. More particularly, the localized peak may be determined by performing the foregoing operations to construct the array of virtual sensors 906A-906K based on the physical sensor 122 and then searching for the peaks that indicate the location. For example, $\mathcal{R} =\{\hat{r}_0 \ldots \hat{r}_K\}$ denotes the set that contains the grid location in which the spatial spectrum scanning is performed. For each location, a steering vector $a_1(\hat{r}_j)$ may be computed and applied to a Capon beamforming technique by computing the spatial spectrum, where $$P_{Capon}^{OSA}(\hat{r}_j) = \frac{1}{a_1^H(\hat{r}_j)\hat{R}_{pp}^{-1}a_1(\hat{r}_j)}.$$

Finally, the location of the source may be found as the argument that maximizes the spatial spectrum, where $P_{Capon}^{OSA}(\hat{r}_j)$, expressed as:

$$\hat{r}_k = \underset{\hat{r}_j \in \mathcal{R}}{\arg\max} P_{Capon}^{OSA}(\hat{r}_j) \qquad \text{EQ. 14}$$

where $(.)^H$ corresponds to the Hermitian operation, and where $a_1(\hat{r}_j)$ is modelled with the virtual weights $w_1(\hat{r}_j) = A(t_1)[w_{1,1}(\hat{r}_j) \ldots w_{1,N}(\hat{r}_j)]^T$ for a free field corresponding to the virtual weight steering vector of the virtual sensors positioned at $[m_{1,1} \ldots m_{1,N}]^T$ due to the physical sensor 122 ($m_1$). In the virtual weights equation, $w_{1,n}(\hat{r}_j)$ is the transfer function that models a time delay from position $\hat{r}_j$ to the virtual sensor position at $m_{1,n}$ and $A(t_1) = \text{diag}(e^{j\omega t_{1,1}}, \ldots, e^{j\omega t_{1,N}})$ is the temporal correction factor with $t_1 = [t_{1,1}, \ldots, t_{1,N}]$ being the time delay to synchronize the virtual sensors to a common time frame and $\omega$ being the angular frequency of the impinging signal.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a method of downhole leak detection, the method comprising obtaining physical signals detected by at least one physical sensor traveling along a wellbore; detecting correlated sequences from the physical signals; constructing a covariance matrix based on the correlated sequences; and computing a spatial spectrum indicative of a location of a leak based on the covariance matrix.

Clause 2, the method of clause 1, further comprising utilizing a beamforming technique to determine a localized peak of the spatial spectrum, wherein the localized peak is indicative of the location of the leak.

Clause 3, the method of clause 1 or 2, further comprising determining an approximate radial distance of the leak relative to the at least one first physical sensor, wherein the location of the leak is expressed by the approximate radial distance.

Clause 4, the method of any one of clauses 1-3, wherein the approximate radial distance comprises two components along two perpendicular axes that form a plane along which the first physical sensor is displaced, and wherein determining the approximate radial distance comprises determining a distance along a first component (x-axis) and a distance along a second component (y-axis).

Clause 5, the method of at least one of clauses 1-4, wherein the radial distance comprises a third component along an axis (z-axis) normal to the plane along which the first physical sensor is displaced, and wherein determining the approximate radial distance comprises determining a distance along the third component.

Clause 6, the method of at least one of clauses 1-5, further comprising performing a coherent sequence extraction operation on the physical signals of the at least one physical sensor to obtain a plurality of virtual signals associated with an array of virtual sensors; and constructing the covariance matrix based on the plurality of virtual signals in addition to the correlated sequences of the physical signals.

Clause 7, the method of at least one of clauses 1-6, further comprising determining a temporal correction factor of the virtual signals corresponding to the array of virtual sensors; determining a modeled transfer function of the virtual signals corresponding to the array of virtual sensors; calculating a virtual weight of the array of virtual sensors relative to the first physical sensor based on the temporal correction factor and the modeled transfer function; and applying the virtual weight to one or more values of the covariance matrix that represent the virtual signals corresponding to the array of virtual sensors.

Clause 8, the method of at least one of clauses 1-7, wherein the covariance matrix based on the correlated sequences comprises a source component, a temporal delay component, and a propagation and attenuation component.

Clause 9, the method of at least one of clauses 1-8, wherein the first physical sensor is traveling along the wellbore at an approximately constant velocity.

Clause 10, the method of at least one of clauses 1-9, wherein the at least one physical sensor consists the first physical sensor.

Clause 11, a downhole leak detection system comprising a leak detector having a physical sensor operable to travel along a wellbore and detect physical signals indicative of a leak proximate the physical sensor; and a processor communicatively connected to the leak detector and operable to obtain the physical signals detected by the physical sensor traveling along a wellbore; detect correlated sequences from the physical signals; construct a covariance matrix based on the correlated sequences; compute a spatial spectrum indicative of a location of a leak based on the covariance matrix; and utilize a beamforming technique to determine a localized peak of the spatial spectrum, wherein the localized peak is indicative of the location of the leak.

Clause 12, the downhole leak detection system of clause 11, wherein the processor is further operable to perform a coherent sequence extraction operation on the physical signals of the physical sensor to obtain a plurality of virtual signals associated with an array of virtual sensors; and construct the covariance matrix based on the plurality of virtual signals in addition to the correlated sequences of the physical signals.

Clause 13, the downhole leak detection system of clause 11 or 12, wherein the processor is further operable to determine a temporal correction factor of the virtual signals corresponding to the array of virtual sensors; determine a modeled transfer function of the virtual signals corresponding to the array of virtual sensors; calculate a virtual weight of the array of virtual sensors relative to the physical sensor based on the temporal correction factor and the modeled transfer function; and apply the virtual weight to one or more values of the covariance matrix that represent the virtual signals corresponding to the virtual sensor.

Clause 14, the downhole leak detection system of any of clauses 11-13, wherein the processor is a component of the leak detector and is disposed inside a casing of the leak detector.

Clause 15, the downhole leak detection system of any of clauses 11-14, wherein the processor is a component of a surface-based electronic device.

Clause 16, a non-transitory machine-readable medium comprising instructions stored therein, for execution by a processor, which when executed by the processor, causes the processor to perform operations comprising obtaining the physical signals detected by the physical sensor traveling along a wellbore; detecting correlated sequences from the physical signals; constructing a covariance matrix based on the correlated sequences; computing a spatial spectrum indicative of a location of a leak based on the covariance matrix; and utilizing a beamforming technique to determine a localized peak of the spatial spectrum, wherein the localized peak is indicative of the location of the leak.

Clause 17, the non-transitory machine-readable medium of clause 16, further comprising instructions stored therein, which when executed by the processor, causes the processor to perform operations comprising performing a coherent sequence extraction operation on the physical signals of the physical sensor to obtain a plurality of virtual signals associated with an array of virtual sensors; and constructing the covariance matrix based on the plurality of virtual signals in addition to the correlated sequences of the physical signals.

Clause 18, the non-transitory machine-readable medium of clause 16 or 17, further comprising instructions stored therein, which when executed by the processor, causes the processor to perform operations comprising: determining a temporal correction factor of the virtual signals corresponding to the array of virtual sensors; determining a modeled transfer function of the virtual signals corresponding to the array of virtual sensors; calculating a virtual weight of the array of virtual sensors relative to the physical sensor based on the temporal correction factor and the modeled transfer function; determining a true steering vector of virtual signals corresponding to a virtual sensor of the array of virtual sensors; and applying the true steering vector and the virtual weight to one or more values of the covariance matrix that represent the virtual signals corresponding to the virtual sensor.

Clause 19, the non-transitory machine-readable medium of any of clauses 16-18, wherein detecting the correlated sequences from the physical signals comprises: determining correlated sequences of the physical signals detected by the physical sensor; and concatenating the correlated sequences into a multichannel representation of the correlated sequences.

Clause 20, the non-transitory machine-readable medium of any of clauses 16-19, wherein the multichannel representation of the correlated sequences comprises a source component, a temporal delay component, and a propagation and attenuation component.

Unless otherwise specified, any use of any form of the terms "connect," "engage," "couple," "attach," or any other term describing an interaction between elements in the foregoing disclosure is not meant to limit the interaction to direct interaction between the elements and may also include indirect interaction between the elements described. As used herein, the singular forms "a", "an" and "the" are intended to include the plural forms as well, unless the context clearly indicates otherwise. Unless otherwise indicated, as used throughout this document, "or" does not require mutual exclusivity. It will be further understood that the terms "comprise" and/or "comprising," when used in this specification and/or the claims, specify the presence of stated features, steps, operations, elements, and/or components, but do not preclude the presence or addition of one or more other features, steps, operations, elements, components, and/or groups thereof. In addition, the steps and components described in the above embodiments and figures are merely illustrative and do not imply that any particular step or component is a requirement of a claimed embodiment.

It should be apparent from the foregoing that embodiments of an invention having significant advantages have been provided. While the embodiments are shown in only a few forms, the embodiments are not limited but are susceptible to various changes and modifications without departing from the spirit thereof.

We claim:

1. A method of downhole leak detection, comprising:
positioning a physical sensor in a wellbore;
wherein the physical sensor consists of only a hydrophone, electromagnetic sensor, or chemical sensor;
moving the physical sensor along the wellbore;
recording a plurality of samples of physical signals detected by the physical sensor while moving the physical sensor along the wellbore;
identifying frames of correlated sequences observed in the plurality of samples provided by the physical sensor;
performing a coherent sequence extraction operation on the physical signals of the physical sensor to obtain a plurality of virtual signals associated with an array of virtual sensors;
constructing a covariance matrix based on the correlated sequences and the plurality of virtual signals;
computing a spatial spectrum that indicates a location of a leak in the wellbore based on the covariance matrix; and
utilizing a beamforming technique to determine a localized peak of the spatial spectrum, wherein the localized peak is indicative of the location of the leak.

2. The method of claim 1, further comprising determining an approximate radial distance of the leak relative to the at least one physical sensor, wherein the location of the leak is expressed by the approximate radial distance.

3. The method of claim 2, wherein the approximate radial distance comprises two components along two perpendicular axes that form a plane along which the first physical sensor is displaced, and wherein determining the approximate radial distance comprises determining a distance along a first component (x-axis) and a distance along a second component (y-axis).

4. The method of claim 3, wherein the radial distance comprises a third component along an axis (z-axis) normal to the plane along which the first physical sensor is displaced, and wherein determining the approximate radial distance comprises determining a distance along the third component.

5. The method of claim 1, further comprising:
determining a temporal correction factor of the virtual signals corresponding to the array of virtual sensors;
determining a modeled transfer function of the virtual signals corresponding to the array of virtual sensors;
calculating a virtual weight of the array of virtual sensors relative to the first physical sensor based on the temporal correction factor and the modeled transfer function; and
applying the virtual weight to one or more values of the covariance matrix that represent the virtual signals corresponding to the array of virtual sensors.

6. The method of claim 1, wherein the covariance matrix based on the correlated sequences comprises a source component, a temporal delay component, and a propagation and attenuation component.

7. The method of claim 1, wherein the physical sensor is traveling along the wellbore at an approximately constant velocity.

8. The method of claim 1, wherein a processor is communicatively coupled to the physical sensor; and wherein the recording a plurality of samples of physical signals is performed by the processor.

9. The method of claim 8, wherein the processor is a component of a surface-based electronic device.

10. The method of claim 8, wherein the physical sensor and the processor are components of a leak detector and wherein the processor is disposed inside a casing of the leak detector.

11. A downhole leak detection system comprising:
a leak detector having a physical sensor, the physical sensor operable to travel along a wellbore and to detect physical signals that indicate a leak proximate the physical sensor; wherein the physical sensor consists of only a hydrophone, electromagnetic sensor, or chemical sensor; and
a processor communicatively coupled to the leak detector and operable to:
record a plurality of samples of physical signals detected by the physical sensor while traveling along the wellbore;
identify frames of correlated sequences observed in the plurality of samples provided by the physical sensor;
performing a coherent sequence extraction operation on the physical signals of the physical sensor to obtain a plurality of virtual signals associated with an array of virtual sensors;
construct a covariance matrix based on the correlated sequences and the plurality of virtual signals;
compute a spatial spectrum that indicates a location of a leak in the wellbore based on the covariance matrix; and
utilize a beamforming technique to determine a localized peak of the spatial spectrum, wherein the localized peak indicates the location of the leak.

12. The downhole leak detection system of claim 11, wherein the processor is further operable to:
determine a temporal correction factor of the virtual signals corresponding to the array of virtual sensors;
determine a modeled transfer function of the virtual signals corresponding to the array of virtual sensors;
calculate a virtual weight of the array of virtual sensors relative to the physical sensor based on the temporal correction factor and the modeled transfer function; and
apply the virtual weight to one or more values of the covariance matrix that represent the virtual signals corresponding to the virtual sensor.

13. The downhole leak detection system of claim 11, wherein the processor is a component of the leak detector and is disposed inside a casing of the leak detector.

14. The downhole leak detection system of claim 11, wherein the processor is a component of a surface-based electronic device.

15. The downhole leak detection system of claim 11, wherein the covariance matrix based on the correlated sequences comprises a source component, a temporal delay component, and a propagation and attenuation component.

16. The downhole leak detection system of claim 11, wherein the physical sensor is traveling along the wellbore at an approximately constant velocity.

17. A non-transitory machine-readable medium comprising instructions stored therein, for execution by a processor, which when executed by the processor, causes the processor to perform operations comprising:
recording a plurality of samples of physical signals detected by a physical sensor traveling along a wellbore; wherein the physical sensor consists of only a hydrophone, electromagnetic sensor, or chemical sensor;
identifying frames of correlated sequences observed in the plurality of samples provided by the physical sensor;
performing a coherent sequence extraction operation on the physical signals of the physical sensor to obtain a plurality of virtual signals associated with an array of virtual sensors;
constructing a covariance matrix based on the correlated sequences and the plurality of virtual signals;
computing a spatial spectrum that indicates a location of a leak in the wellbore based on the covariance matrix; and
utilizing a beamforming technique to determine a localized peak of the spatial spectrum, wherein the localized peak indicates the location of the leak.

18. The non-transitory machine-readable medium of claim 17, further comprising instructions stored therein, which when executed by the processor, causes the processor to perform operations comprising:
determining a temporal correction factor of the virtual signals corresponding to the array of virtual sensors;
determining a modeled transfer function of the virtual signals corresponding to the array of virtual sensors;
calculating a virtual weight of the array of virtual sensors relative to the physical sensor based on the temporal correction factor and the modeled transfer function;
determining a true steering vector of the virtual signals corresponding to a virtual sensor of the array of virtual sensors; and
applying the true steering vector and the virtual weight to one or more values of the covariance matrix that represent the virtual signals corresponding to the virtual sensor.

19. The non-transitory machine-readable medium of claim 17, wherein detecting the correlated sequences from the physical signals comprises:
determining correlated sequences of the physical signals detected by the physical sensor; and
concatenating the correlated sequences into a multichannel representation of the correlated sequences.

20. The non-transitory machine-readable medium of claim 19, wherein the multichannel representation of the correlated sequences comprises a source component, a temporal delay component, and a propagation and attenuation component.

* * * * *